US008942763B2

(12) United States Patent
Mildh et al.

(10) Patent No.: US 8,942,763 B2
(45) Date of Patent: Jan. 27, 2015

(54) RADIO COMMUNICATION SYSTEM, METHOD AND ARRANGEMENT FOR USE IN A RADIO COMMUNICATION SYSTEM

(71) Applicant: Telefonaktiebolaget L M Ericsson (publ), Stockholm (SE)

(72) Inventors: Gunnar Mildh, Sollentuna (SE); Jari Vikberg, Jarna (SE); Erik Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 134 days.

(21) Appl. No.: 13/697,767

(22) PCT Filed: Sep. 24, 2012

(86) PCT No.: PCT/SE2012/051007
§ 371 (c)(1),
(2) Date: Nov. 13, 2012

(87) PCT Pub. No.: WO2013/169161
PCT Pub. Date: Nov. 14, 2013

(65) Prior Publication Data
US 2014/0051393 A1 Feb. 20, 2014

Related U.S. Application Data

(60) Provisional application No. 61/644,040, filed on May 8, 2012.

(51) Int. Cl.
| H04M 1/00 | (2006.01) |
|---|---|
| H04W 12/08 | (2009.01) |
| H04W 48/16 | (2009.01) |
| H04W 76/02 | (2009.01) |
| H04W 88/10 | (2009.01) |
| H04W 92/02 | (2009.01) |

(52) U.S. Cl.
CPC .............. *H04W 12/08* (2013.01); *H04W 48/16* (2013.01); *H04W 76/02* (2013.01); *H04W 88/10* (2013.01); *H04W 92/02* (2013.01)
USPC ...................... 455/552.1; 455/550.1; 455/411

(58) Field of Classification Search
CPC .. H04W 12/06; H04W 88/06; H04M 1/72519
USPC ...................... 455/552.1, 550.1, 411
See application file for complete search history.

(56) References Cited

U.S. PATENT DOCUMENTS

2007/0135121 A1* 6/2007 Bae et al. ................... 455/432.1
2010/0017608 A1* 1/2010 Larsen ......................... 713/168
(Continued)

FOREIGN PATENT DOCUMENTS

| EP | 1 885 141 A1 | 2/2008 |
|---|---|---|
| WO | WO 2009/127238 A1 | 10/2009 |

(Continued)

OTHER PUBLICATIONS

International Search Report and Written Opinion Corresponding to International Application No. PCT/SE2012/051007; Date of Mailing: Oct. 7, 2013; 14 Pages.

*Primary Examiner* — Danh Le
(74) *Attorney, Agent, or Firm* — Myers Bigel Sibley & Sajovec, P.A.

(57) ABSTRACT

A system includes a first access network arranged to operate according to a first Radio Access Technology, a second access network arranged to operate according to a second Radio Access Technology, and a user device which is connectable to the first access network and to the second access network. The system also includes an authentication node arranged to identify the user device, when seeking access to the second access network, through a user device identifier for the user device, wherein the user device identifier is associated with the first access network. A query node provides information about a context of the user device in the first access network based on the user device identifier. An access selection node generates an access selection decision for the access sought by the user device to the second access network based on the provided context, and the access selection decision is then executed.

31 Claims, 9 Drawing Sheets

(56) References Cited

U.S. PATENT DOCUMENTS

2012/0184299 A1* 7/2012 Loveland et al. .......... 455/456.3
2013/0117828 A1* 5/2013 Larsen .............................. 726/5

FOREIGN PATENT DOCUMENTS

| WO | WO 2010/019848 A1 | 2/2010 |
| WO | WO 2010/132710 A1 | 11/2010 |

* cited by examiner

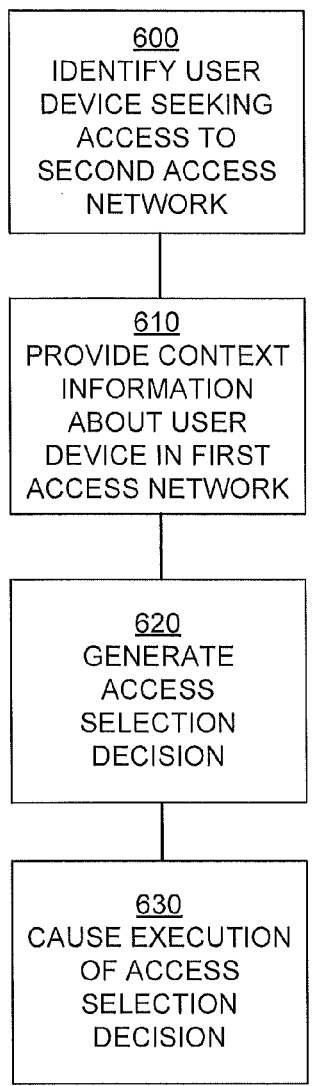
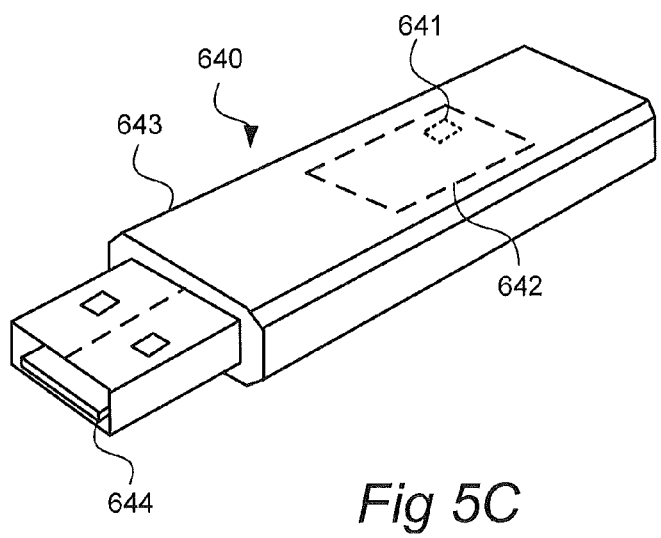
Fig 5B
Fig 5C

RADIO COMMUNICATION SYSTEM, METHOD AND ARRANGEMENT FOR USE IN A RADIO COMMUNICATION SYSTEM

CROSS-REFERENCE TO RELATED APPLICATION

This application is a 35 U.S.C. §371 early national stage application of PCT International Application No. PCT/SE2012/051007, filed on 24 Sep. 2012, which claims priority to U.S. Provisional Application No. 61/644,040, filed on 8 May 2012. The disclosures of the above referenced applications are hereby incorporated herein in their entireties by reference.

TECHNICAL FIELD

The present invention generally relates to mobile communication. More particularly, the invention relates to a radio communication system comprising a first access network arranged to operate according to a first Radio Access Technology, a second access network arranged to operate according to a second Radio Access Technology, and a user device which is connectable to the first access network and to the second access network. The invention also relates to a method and an arrangement for use in a radio communication system as referred to above, and to an associated computer readable storage medium.

BACKGROUND

Different Radio Access Technologies (RAT:s) are available in the modern world of mobile communication, allowing a user of a user device such as a mobile terminal (User Equipment (UE)) to access communication services like voice calls, Internet browsing, video calls, file transmissions, audio/video streaming, electronic messaging and e-commerce. Radio Access Technologies can be divided into different categories.

A first and probably most widely spread category includes RATs suitable for use in mobile or cellular telecommunications systems like GSM (Global System for Mobile Communications), UMTS (Universal Mobile Telecommunications System), FOMA (Freedom of Mobile Multimedia Access), EPS (Evolved Packet System), D-AMPS (Digital-Advanced Mobile Phone Service), CDMA2000 (Code Division Multiple Access 2000) or WiMAX (Worldwide Interoperability for Microwave Access). Common examples of RATs in this first category are 3GPP (3rd Generation Partnership Project) GPRS/EDGE (General Packet Radio Service/Enhanced Data rates for Global Evolution), 3GPP WCDMA/HSPA (Wideband Code Division Multiple Access/High-Speed Packet Access), 3GPP LTE/E-UTRAN (Long-Term Evolution/Evolved Universal Terrestrial Radio Access Network), and TD-SCDMA (Time Division Synchronous Code Division Multiple Access).

A second category includes RATs which are suitable for use in short-range wireless communication networks, such as Wi-Fi or WLAN (Wireless Local Area Network). One example of a RAT in this second category is the IEEE 802.11 family of wireless standards. Other examples include Bluetooth and NFC (Near-Field Communication).

Most user devices are nowadays enabled for use with more than one RAT, such as one or more RATs selected from the first category, as well as one or more RATs selected from the second category. A mobile terminal, from now on referred to as User Equipment or UE, enabled both for cellular access (e.g. 3GPP LTE/E-UTRAN and/or WCDMA/HSPA for use in EPS and/or UMTS) and for Wi-Fi access, will be used herein as an example of such a multi-RAT-enabled user device.

Because of the inherent differences in architecture and operation between mobile telecommunications networks on the one hand and Wi-Fi networks on the other hand, in many existing setups there has not been any integration between the two. Allowing two such networks to co-exist in parallel but "hidden" from each other is fully acceptable, but not optimal from resource utilization, load distribution and user experience perspectives. Therefore, certain integration attempts have been made, as will now be described in some greater detail, however only for background purposes.

Introduction

Operators of mobile telecommunications networks are today mainly using Wi-Fi to offload traffic from the mobile networks, but the opportunity to improve end-user experience regarding performance is also becoming more important. The current Wi-Fi deployments are mainly totally separate from mobile networks, and are to be seen as non-integrated. The usage of Wi-Fi is mainly driven due to the free and wide unlicensed spectrum, and the increased availability of Wi-Fi in mobile terminals like smartphones and tablets. The end-users are also becoming more and more at ease with using Wi-Fi for example at offices and homes.

The different business segments for Wi-Fi regarding integration possibilities can be divided into mobile operator hosted/controlled versus third-party hosted/-controlled Wi-Fi APs (Access Points). Here, "third-party" is seen as anything else than a mobile operator, and that the third-party is not totally "trusted" by the mobile operator. A third-party could be for example a Wi-Fi operator or an end-user himself/herself. In both segments there exist public/hotspot, enterprise and residential deployments.

Different Types of Wi-Fi Integration to Mobile Networks

Wi-Fi integration towards the mobile core network is emerging as a good way to improve the end-user experience further. These solutions consist mainly of the following components: common authentication between 3GPP and Wi-Fi, and integration of Wi-Fi user plane traffic to the mobile core network. The common authentication is based on automatic (U)SIM-based ((Universal) Subscriber Identity Module) authentication in both access types. The Wi-Fi user plane integration gives the mobile operator an opportunity to provide the same services, like parental control and subscription-based payment methods, for the end-users both when connected via 3GPP and when connected via Wi-Fi. Different solutions are standardized in 3GPP. Overlay solutions (S2b, S2c) have been specified since 3GPP Release 8, while integration solutions (S2a) are currently work-in-progress (S2a, S2b, S2c indicating the 3GPP interface/reference point names towards the PDN-GW). These solutions are specified in 3GPP TS 23.402 (current version=11.3.0), which can be obtained from the website of the 3rd Generation Partnership Project at http://www.3gpp.com/.

Wi-Fi integration into radio access network (RAN) is also emerging as an interesting study object. This has basically two different possible levels that could be implemented either separately or together. A first level of integration is to combine both 3GPP and Wi-Fi in the small pico base stations to gain access to the Wi-Fi sites with 3GPP technology, and vice versa. A second level of integration is to integrate the Wi-Fi access tighter into the RAN by introducing enhanced network controlled traffic steering between 3GPP and Wi-Fi based on knowledge about the total situation on the different accesses. The driver for this second level of integration could be to avoid potential issues with UE (User Equipment) controlled Wi-Fi selection, such as selecting Wi-Fi when the Wi-Fi connection is bad or when the UE is moving, thus giving better end-user performance and better utilization of the combined Wi-Fi and cellular radio network resources.

FIG. 1 illustrates an existing network architecture for integration of a mobile telecommunications system 110 in the form of an EPS system, and a Wi-Fi access network 120. As is well known, EPS was introduced in 3GPP Release 8 and Release 9. For detailed information about EPS, reference is made to 3GPP TS 23.401 (current version=11.2.0). The mobile telecommunications (EPS) system 110 comprises a radio access network 112 known as E-UTRAN (Evolved Universal Terrestrial Radio Access Network) and a core network 114 known as EPC (Evolved Packet Core). The E-UTRAN has a combined base station and radio network controller known as eNodeB. The EPC has units known as MME (Mobility Management Entity) and a Serving GW (Gateway). As is seen in FIG. 1, the eNodeB is connected via the S1 interfaces, S1-MME and S1-U to the MME and Serving GW, respectively. FIG. 1 also shows how the Wi-Fi access network 120 is connected to the PDN-GW via the S2a interface and to the 3GPP AAA Server via the STa interface. The shown Wi-Fi access network is just an example deployment and contains a Wi-Fi Access Point (AP), a Wi-Fi Access Controller (AC) and a Broadband Network Gateway (BNG).

Background to Hotspot 2.0

Different standards organizations have started to recognize the needs for an enhanced user experience for Wi-Fi access, this process being driven by 3GPP operators. An example of this is the Wi-Fi Alliance with the Hotspot 2.0 (HS2.0) initiative, now officially called PassPoint. For detailed information about Hotspot 2.0, reference is made to Wi-Fi Alliance Hotspot 2.0 (Release 1) TS Version 1.0.0, which can be obtained from the website of the Wi-Fi Alliance at http://www.wi-fi.org/. HS2.0 is primarily geared towards Wi-Fi networks. HS2.0 builds on IEEE 802.11u, and adds requirements on authentication mechanisms and auto-provisioning support. For detailed information about IEEE 802.11u, reference is made to IEEE 802.11u-2011, Amendment 9: Interworking with External Networks, which can be obtained from the website http://standards.ieee.org.

The momentum of Hotspot 2.0 is due to its roaming support, its mandatory security requirements and for the level of control it provides over the terminal for network discovery and selection. Even if the current release of HS2.0 is not geared towards 3GPP interworking, 3GPP operators are trying to introduce additional traffic steering capabilities, leveraging HS2.0 802.11u mechanisms. Because of the high interest of 3GPP operators, there will be a second release of HS2.0 focusing on 3GPP interworking requirements.

The HS2.0 contains the following procedures:

1 Discovery: Where the terminal discovers a Wi-Fi network, and probes it for HS2.0 support, using 802.11u and HS 2.0 extensions.

2 Registration is performed by the terminal towards the Wi-Fi Hot-spot network if there is no valid subscription for that network.

3 Provisioning: Policy related to the created account is pushed towards the terminal. This only takes place when a registration takes place.

4 Access: Cover the requirements and procedures to associate with a HS2.0 Wi-Fi network.

Background to Access Network Discovery and Selection Function

The Access Network Discovery and Selection Function (ANDFS) is an entity defined by 3GPP for providing access discovery information as well as mobility and routing policies to the UE. The information and policies provided by the ANDSF may be subscriber specific.

Access Discovery Information is used to provide access discovery information to the UE, which can assist the UE to discover available (3GPP and) non-3GPP access networks without the burden of continuous background scanning.

Inter-System Mobility Policies (ISMP) are policies which guide the UE to select the most preferable 3GPP or non-3GPP access. The ISMP are used for UEs that access a single access (3GPP or Wi-Fi) at a time, Inter-System Routing Policies (ISRP) are policies which guide the UE to select over which access a certain type of traffic or a certain APN shall be routed. The ISRP are used for UEs that access both 3GPP and Wi-Fi simultaneously.

Background to Permanent UE Identifiers

The different permanent UE identifiers are defined in 3GPP TS 23.003 (current version=11.2.0). The definition of International Mobile Subscriber Identity (IMSI) is shown in FIG. 2. As seen in this drawing, IMSI is composed of three parts:

1. A Mobile Country Code (MCC) consisting of three digits. The MCC uniquely identifies the country of the mobile subscriber/subscription of the UE.

2. A Mobile Network Code (MNC) consisting of two or three digits. The MNC identifies the home PLMN (Public Land Mobile Network) of the mobile subscriber/subscription. The length of the MNC (two or three digits) depends on the value of the MCC.

3. Mobile Subscriber Identification Number (MSIN) identifying the mobile subscriber within a PLMN.

The National Mobile Subscriber Identity (NMSI) consists of the Mobile Network Code (MNC) and the Mobile Subscriber Identification Number (MSIN).

The International Mobile station Equipment Identity and Software Version number (IMEISV), the International Mobile station Equipment Identity (IMEI) and the MS international PSTN/ISDN number (MSISDN) are also defined in 3GPP TS 23.003 but are not further described herein.

In the EPS (110, FIG. 1), the permanent UE identities are only known in the EPC 114, whereas the E-UTRAN 112 is only aware of temporary UE identities. An example of this is the Globally Unique Temporary UE Identity (GUTI) that uniquely identifies the MME which allocated the GUTI and also identifies the UE within the MME that allocated the GUTI. Another example used for paging purposes is the S-TMSI. GUTI and S-TMSI are also defined in the aforementioned 3GPP TS 23.003. The GUTI is allocated to the UE during an Attach procedure as defined in the afore-mentioned 3GPP TS 23.401 (also see FIGS. 3A and 3B), and the serving MME holds the association between the GUTI and the UE permanent identifier(s).

When the UE accesses a Wi-Fi network, it can be authenticated using EAP-SIM (Extensible Authentication Protocol-SIM) and EAP-AKA (Extensible Authentication Protocol-Authentication and Key Agreement) protocols. In these cases, the UE can be identified by either the full authentication Network Access Identifier (NAI) or by the fast re-authentication NAI. The full authentication NAI contains the IMSI of the UE, and the fast re-authentication NAI is similar to the temporary identities used in LTE access in the sense that it is the 3GPP AAA Server that knows the relation between the fast re-authentication NAI and the full authentication NAI.

Overview 3GPP Attach Procedure

FIGS. 3A and 3B shows an overview of the attach procedure used in for instance the E-UTRAN 112 of FIG. 1. The attach procedure is described in detail in 3GPP TS 23.401.

During this attach procedure, the UE is authenticated to the network in a step 5a, using credentials stored on the (U)SIM ((Universal) Subscriber Identity Module) in the UE. At initial attach, the UE will use the IMSI as an identifier of the UE subscription (and (U)SIM). During the attach to the network, the UE might be assigned other shorter temporary identifiers such as S-TMSI, P-TMSI, URNTI, etc. The MME/SGSN in the 3GPP Core Network (CN) will be aware of the IMSI associated and the mapping to temporary identifiers when the UE has an active context in the network.

Overview of Wi-Fi Attach Procedure with EAP-SIM/AKA Authentication

FIG. 4 shows an example procedure for a Wi-Fi-enabled UE connecting to a Wi-Fi network, such as access network 120 in FIG. 1, with a Wi-Fi Access Controller (AC). Other procedures may also be used depending on implementation in the UE and network. The EAP signalling is in this procedure used to authenticate the UE towards the network. The UE uses IMSI or some other certificate to identify itself towards the network.

Some Problems with Existing Solutions

The current methods for integration of Wi-Fi into a 3GPP network described above do not offer good support for network-controlled Wi-Fi/3GPP access selection and service mapping, taking into consideration radio access related input parameters such as UE mobility, 3GPP/Wi-Fi cell and network load, radio link performance, etc.

In order to achieve this functionality, it is required to link (connect, associate) the UE context in the 3GPP radio access network (RAN)—which holds information about radio performance, UE mobility, etc. on the 3GPP side—with the UE context in the Wi-Fi network. This can then enable a network entity to take decisions whether the UE should access the Wi-Fi network or not, depending on if the UE is stationary, and/or has a good connection to the Wi-Fi AP (Access Point), etc. The decision can then be signaled to the UE or executed internally in the 3GPP/Wi-Fi network (for instance to control UE admission to Wi-Fi).

Although mechanisms have been introduced for allowing the UE to perform authentication towards the Wi-Fi network using (U)SIM credentials and identities (IMSI), there is currently no mechanism available for connecting the UE RAN context in the 3GPP RAN with the UE Wi-Fi access context.

This means that with existing solutions, there is no node in the access network that can identify a single UE to be the same UE when it is active in Wi-Fi and 3GPP, respectively—even if it is handled by the same physical base station (e.g. eNodeB, WiFi AC).

SUMMARY

It is accordingly an object of the invention to eliminate or alleviate at least some of the problems referred to above.

The present inventors have realized, after inventive and insightful reasoning, that it will be beneficial to introduce additional functionality serving to:
  Locate the UE RAN context in the other RAT (Wi-Fi, 3GPP RAN) based on a permanent or temporary identifier of the UE.
  Convey RAN related parameters between the RAN entities serving the UE and thus enabling access network selection or service mapping decisions for the UE to be taken in the network.
  Convey the access network selection or service mapping decisions to RAN nodes (Wi-Fi or 3GPP RAN).

A basic concept may also include:
  Conveying the access network selection or service mapping decisions to the UE (e.g. in the form of access selection commands or access selection policies).
  Assigning temporary identities to the UE while connected in one RAT, which the UE subsequently uses to identify itself in the other RAT.

The concept can be used together with existing methods for integrating UE Wi-Fi traffic in 3GPP networks (e.g. S2a method as seen in FIG. 1 and S2b and S2c methods not shown in FIG. 1) as well as existing authentication methods such as (U)SIM-based (e.g. EAP-SIM or EAP-AKA, as described above), or alternatively certificate-based (EAP-TLS), etc. For a further description of EAP-TLS (Extensible Authentication Protocol-Transport Layer Security), reference is made to the open standard RFC 5216 by IETF (Internet Engineering Task Force), which is available at http://www.rfc-editor.org/rfc/rfc5216.txt.

On a high level, such a basic concept may form the basis for network-controlled access selection or service mapping as follows:

1. When the UE is connected to one access network (e.g. 3GPP) (Access A) and finds a suitable cell of the other access network (e.g. Wi-Fi) (Access B), it will, depending on implementation rules, initiate access procedure towards Access B.

2. During this procedure the UE will identify itself in the network using an identifier known in Access A, or that can be translated by Access B to an identifier known in Access A.

3. This identifier will be used by a network node to find the RAN context in the Access A.

4. Once the RAN context has been located the network can perform internal signaling between the RAN nodes of the different access (Access A and Access B) to convey radio related parameters which can be used for access selection (e.g. moving a UE towards the new access (Access B), leaving the old access (Access A)) and/or service mapping (e.g. mapping some services on the new access (Access B), keeping ongoing UE connection to the old access (Access A)).

5. Once an access selection/service mapping decision has been performed, the network entity responsible for the decisions will convey this information to the UE or to some other network entity which has control of the UE access selection or service mapping.

One aspect of the present invention can therefore be summarized as a radio communication system comprising a first access network arranged to operate according to a first Radio Access Technology, a second access network arranged to operate according to a second Radio Access Technology, and a user device which is connectable to said first access network and to said second access network. The system further comprises:
  an authentication node arranged to identify said user device, when seeking access to said second access network, through a user device identifier for said user device, wherein said user device identifier is associated with said first access network;
  a query node arranged to provide information about a context of said user device in said first access network based on said user device identifier; and
  an access selection node arranged to generate an access selection decision for the access sought by the user device to the second access network based on the provided context information.

The system is arranged to cause said access selection decision to be executed.

In one or more embodiments, the authentication node may be arranged to identify said user device based on a user identifier provided by the user device. This identifier may be an International Mobile Subscriber Identity (IMSI).

In one or more embodiments, the identifier is a temporary identifier assigned to said user device in said first access network, wherein said authentication node is arranged to use the temporary identifier for retrieving a permanent identifier of said user device from a network resource in or via said first access network. The temporary identifier may be, for instance, a Packet Temporary Mobile Subscriber Identity (P-TMSI) or Shortened Temporary Mobile Subscriber Identity (S-IMSI).

The feature "said user device identifier is associated with said first access network" is to be construed broadly to comprise, without limitations, cases where the user device identifier is directly associated with or known to the first access network (for instance a temporary identifier like P-TMSI), as well as cases where the user device identifier is indirectly associated with the first access network (for instance in the form of a mapping between a temporary identifier like P-TMSI—which is directly known to the first access network—and a permanent identifier like IMSI, wherein the mapping is held by a network node somewhere in the radio communication system, for instance in a node in a core network coupled to the first access network).

In one or more embodiments, the context information provided by said query node about said user device includes a current location of said user device in said first access network.

Moreover, said query node may be further configured for signaling with said first access network and/or said second access network to provide parameters to said access selection node, wherein said access selection node is configured to generate said access selection decision based on said parameters.

These parameters may typically relate to one or more of the following:
 mobility data about said user device,
 work load for a current access point of said user device in said first access network,
 work load for an access point in said second access network to which said user device seeks access,
 transport network load in either of said first or second access networks,
 radio link performance for said user equipment in said first access network,
 Radio Access Technology-specific limitations in either of said first or second access networks,
 ongoing services used by said user device,
 capabilities of said user device for said first or second Radio Access Technologies, and
 a subscription profile of an end-user associated with said user device.

In one or more embodiments, the access selection decision involves at least one of the following:
 connecting said user device to said second access network,
 disconnecting said user device from said first access network,
 mapping a first service of said user device to said first access network and a second service of said user device to said second access network, and
 maintaining connection for said user device with said first access network. Hence, typical implications of the term "access selection decision" are that the user device shall be connected or disconnected to any of the first and second access networks, that the user device shall maintain a current connection, and/or that services utilized by the user device shall be split between the first and second access networks.

In one or more embodiments, the access selection node is further configured to cause transmission of said access selection decision to said user device for execution of said access selection decision.

Alternatively or additionally, the access selection node may be further configured to cause transmission of said access selection decision to said first access network and/or to said second access network for execution of said access selection decision.

The first access network may be part of a mobile telecommunication system compliant with, for instance, GSM, UMTS, FOMA, EPS, D-AMPS or CDMA2000. Hence, the first access network may for instance be capable of radio communication in accordance with GPRS/EDGE, WCDMA/HSPA, LTE/E-UTRAN, or any combination thereof, or alternatively TD-SCDMA. Other existing and future mobile telecommunication systems and radio communication technologies are however also feasible.

The second access network may be a short-range wireless communication network compliant with, for instance, IEEE 802.11 (Wi-Fi or WLAN). Alternatively, the second access network may be of any of the types referred to above for the first access network. Other existing and future technologies are however also feasible, as was referred to in the background section of this document.

The authentication node, query node and access selection node are to be seen as functional elements rather than structural. Hence, in an implementation of the system, the functionalities of these three nodes may be split between and/or performed in a distributed cooperative manner by other, existing nodes in the first and second access networks, or in the user device. Some examples of this will be found in the detailed description section of this document. Alternatively, some or all of the functionalities of these three nodes may be performed by separate hardware dedicated for this purpose, such as appropriately configured computer equipment.

Another aspect of the present invention can be summarized as a method for use in a radio communication system of the type which comprises a first access network arranged to operate according to a first Radio Access Technology, a second access network arranged to operate according to a second Radio Access Technology, and a user device which is connectable to said first access network and to said second access network. The method comprises:
 identifying said user device, when seeking access to said second access network, through a user device identifier for said user device, wherein said user device identifier is associated with said first access network;
 providing information about a context of said user device in said first access network based on said user device identifier;
 generating an access selection decision for the access sought by the user device to the second access network based on the provided context information; and
 causing execution of said access selection decision.

In one or more embodiments, the user device is identified based on a user identifier provided by the user device. This identifier may be an International Mobile Subscriber Identity (IMSI).

In one or more embodiments, the identifier is a temporary identifier assigned to said user device in said first access network, and wherein the identifying of said user device further comprises using the temporary identifier for retrieving a permanent identifier of said user device from a network resource in or via said first access network.

In one or more embodiments, the context information provided by said query node about said user device includes a current location of said user device in said first access network.

Moreover, the method may further comprise:

signaling with said first access network and/or said second access network to provide parameters; and generating said access selection decision based on the provided parameters.

These parameters may typically relate to one or more of the following:

mobility data about said user device, work load for a current access point of said user device in said first access network, work load for an access point in said second access network to which said user device seeks access, transport network load in either of said first or second access networks, radio link performance for said user equipment in said first access network, Radio Access Technology-specific limitations in either of said first or second access networks, ongoing services used by said user device, capabilities of said user device for said first or second Radio Access Technologies, and a subscription profile of an end-user associated with said user device.

In one or more embodiments, the access selection decision involves at least one of the following:

connecting said user device to said second access network, disconnecting said user device from said first access network, mapping a first service of said user device to said first access network and a second service of said user device to said second access network, and maintaining connection for said user device with said first access network.

In one or more embodiments, the generated access selection decision may be transmitted to said user device for execution of the access selection decision.

Alternatively or additionally, the generated access selection decision may be transmitted to said first access network and/or to said second access network for execution of the access selection decision.

Yet another aspect of the present invention can be summarized as a computer readable storage medium encoded with instructions that, when loaded and executed by a processor, causes performance of the method referred to above.

Still another aspect of the present invention can be summarized as an arrangement for use in a radio communication system comprising a first access network arranged to operate according to a first Radio Access Technology and a second access network arranged to operate according to a second Radio Access Technology, wherein said arrangement comprises:

means for identifying a user device, when seeking access to said second access network, through a user device identifier for said user device, wherein said user device identifier is associated with said first access network;

means for providing information about a context of said user device in said first access network based on said user device identifier; and means for generating an access selection decision for the access sought by the user device to the second access network based on the provided context information.

In embodiments of this arrangement, the means for identifying a user device may be implemented by the aforementioned authentication node in the radio communication system aspect of the invention. Correspondingly, in embodiments of this arrangement, the means for providing information about a context of said user device may be implemented by the aforementioned query node in the radio communication system aspect of the invention. Also, in embodiments of this arrangement, the means for generating an access selection decision may be implemented by the aforementioned access selection node in the radio communication system aspect of the invention.

The arrangement may further comprise means for causing said access selection decision to be executed in said radio communication system.

In addition, the arrangement may further comprise means for causing performance of any functional feature of the method aspect referred to above.

For further objects, features and advantages of the invention and/or its embodiments, reference is made to the following detailed description, to the attached claims as well as to the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Embodiments of the invention will be described in further detail below with reference to the accompanying drawings.

FIG. 5B is a flowchart diagram to illustrate the functionality of an embodiment of the present invention.

FIG. 5C illustrates a computer readable storage medium encoded with instructions that, when loaded and executed by a processor, may cause performance of the functionality shown in FIG. 5B.

DETAILED DESCRIPTION

Figure 1:
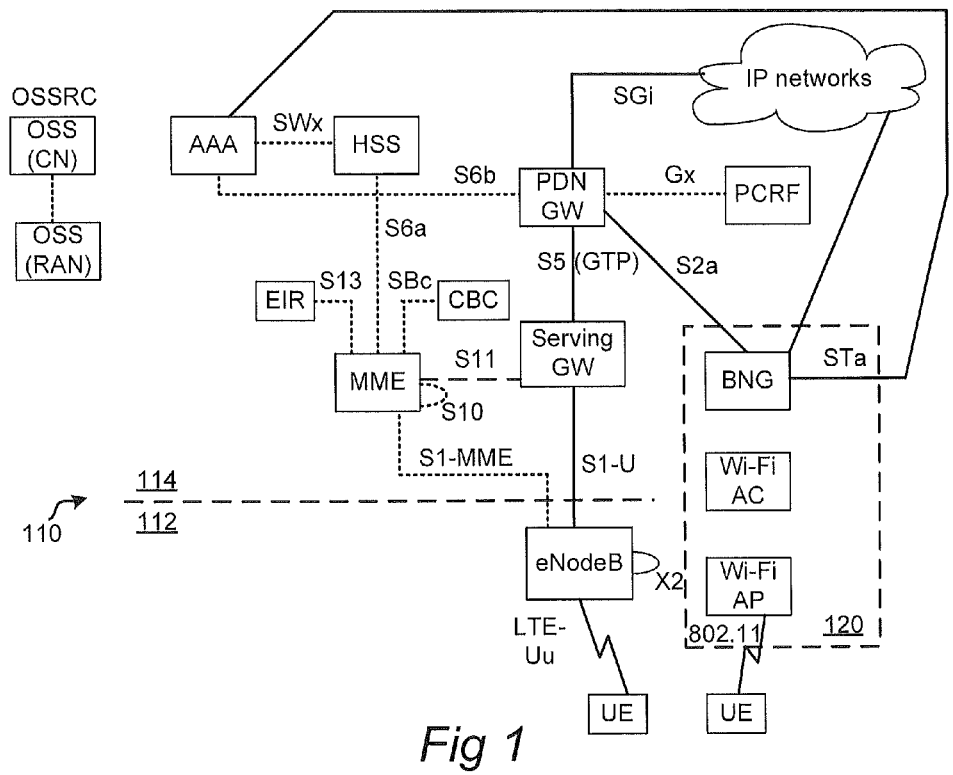
FIG. 1 schematically illustrates an existing network architecture for integration of a mobile telecommunications system and a Wi-Fi access network.
Figure 2:
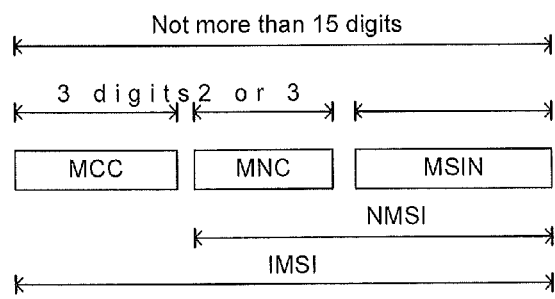
FIG. 2 illustrates the definition of International Mobile Subscriber Identity (IMSI).

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 5A:
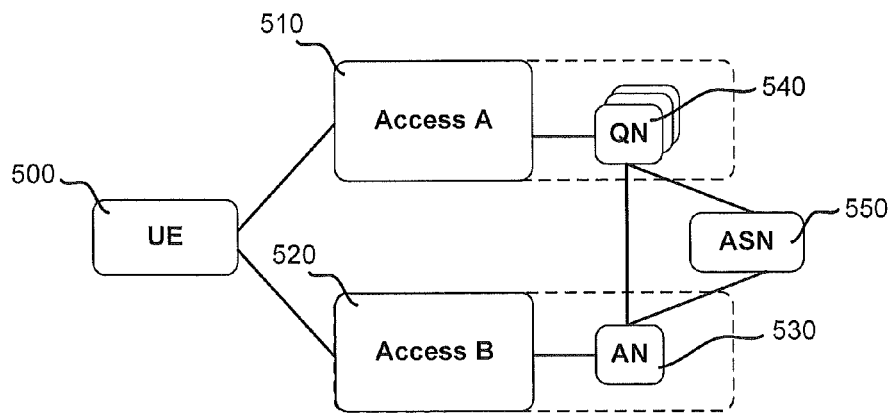
FIG. 5A schematically illustrates a high level functional architecture of an embodiment of the present invention.

A high level functional architecture of an embodiment of the present invention is shown in FIG. 5A. A corresponding functionality is shown in FIG. 5B. As seen in FIG. 5A, a user device 500 is connectable to a first access network 510, also referred to as Access A. The user device 500 is also connectable to a second access network 520, also referred to as Access B. The first access network 510, Access A, is arranged to operate according to a first Radio Access Technology, which in the disclosed embodiments is either 3GPP WCDMA/HSPA or LTE/E-UTRAN, or WCDMA/HSPA and LTE/E-UTRAN in combination. Correspondingly, the second access network 520, Access B, is arranged to operate according to a second Radio Access Technology, which in the disclosed embodiment is WiFi. Thus, in the disclosed embodiments the user device 500 is a user equipment, UE. An embodiment of such a UE is illustrated in more detail as 900 in FIG. 9 and will be described in more detail later. Other embodiments may be however based on other Radio Access Technologies for the first and second access networks 510, 520, as has been referred to previously in this document.

The architecture shown in FIG. 5A moreover comprises an Authentication Node (AN) 530, one or more Query Nodes (QNs) 540 and an Access Selection Node (ASN) 550. The illustration shows that for example the QN 540 may be part of Access A or outside of Access A. In a similar way, the AN 530 may be part of Access B or outside Access B. When it comes to the ASN 550, it is shown in FIG. 5A as being outside both Access A and B. Any other alternatives are also possible, i.e. the ASN 550 may be part of Access A or Access B as well. It is also possible that the ASN 550 is distributed, such that its functionality is performed by or at more than one entity in the system. Furthermore, it is also possible that the communication between the AN 530 and the QN(s) 540 occurs via the ASN 550, or that the communication occurs directly between these functions.

As is seen in the flowchart in FIG. 5B, step 600, the authentication node AN 530 is arranged to identify the UE 500 when seeking access to the second access network 520, Access B, through a user device identifier for the UE 500, wherein this user device identifier is associated with the first access network 510, Access A.

As is seen further in the flowchart in FIG. 5B, step 610, the query node QN 540 is arranged to provide information about a context of the UE 500 in the first access network 510, Access A, based on the user device identifier.

Moreover, as is seen further in the flowchart in FIG. 5B, step 620, the access selection node ASN 550 is arranged to generate an access selection decision for the access sought by the UE 500 to the second access network 520, Access B, based on the provided context information.

Finally, as is seen further in the flowchart in FIG. 5B, step 630, the system is arranged to cause the access selection decision to be executed.

It is to be understood that FIG. 5A is a logical drawing rather than a physical; hence the functions of the different entities shown in FIG. 5A can be implemented in different physical units in the system. For example, if Access A is 3GPP WCDMA/HSPA and Access B is Wi-Fi, then the QN 540 could be communicating towards a radio network controller (RNC) in Access A, or it may be implemented as part of the RNC. In another example, if Access A is 3GPP LTE/E-UTRAN and Access B is Wi-Fi, then the QN 540 could be communicating towards the eNodeB in the E-UTRAN 112 of FIG. 1, or it may be implemented as part of the eNodeB. Correspondingly, the AN 530 may be part of for example a Wi-Fi Access Controller (AC)—such as the one shown in the Wi-Fi access network 120 of FIG. 1—or it may communicate with such a Wi-Fi AC. Also, in this case, the ASN 550 could implemented as part of the Wi-Fi AC, the RNC or as a stand-alone physical node.

The envisioned solution according to FIGS. 5A and 5B is a target-based network-controlled solution, where the UE by itself tries to perform access to the target access (Access B), which then triggers the network to take an access selection or services mapping decision.

It is to be noticed that this is distinctly different from the existing inter-RAT handover mechanism within 3GPP, where the UE sends a measurement report to the source RAT (over the source radio), so that the source RAT can initiate handover (to a specific target cell). In those types of existing solutions, there is no need for the functionality of finding the RAT context in the source RAT based on a UE identifier, since the handover decision is taken in the source RAT prior to UE accessing the target RAT. The envisioned solution according to FIGS. 5A and 5B moreover relies on that the UE will not leave the source RAT until it has successfully connected to the target RAT—which is different from existing procedures. This makes it possible to use a mechanism in the target RAT for controlling the UE access selection (i.e. by denying the UE access in the target RAT, the UE will stay in the source RAT).

The advantage of such target-based solutions is that they do not require any UE impacts (meaning that they can be applied to existing UEs on the market). Target-based solutions in accordance with the present invention can however still benefit from UE impacts.

FIG. 5C shows a schematic view of a computer readable storage medium 640 which may be used to accommodate instructions for performing the functionality of the present invention, as is generally outlined in FIG. 5B. In the embodiment shown in FIG. 5C, the computer-readable medium 640 is a memory stick, such as a Universal Serial Bus (USB) stick. The USB stick 640 comprises a housing 643 having an interface, such as a connector 644, and a memory chip 642. The memory chip 642 is a flash memory, i.e. a non-volatile data storage that can be electrically erased and re-programmed. The memory chip 642 is programmed with instructions 641 that when loaded (possibly via the connector 644) into a processor will cause execution of the method.

The processor may be at least one CPU (Central Processing Unit), DSP (Digital Signal Processor), FPGA (Field-Programmable Gate Arrays), ASIC (Application Specific Integrated Circuit) or any other electronic programmable logic device, or a combination of any such devices, adapted for executing the instructions stored on the aforementioned storage medium 640. Such a processor may act as a controller in a node in the first or second access networks (Access A, Access B). The instructions may be adapted for execution by several processors, possibly located in different nodes in said first and second networks, in a distributed cooperative manner, as is mentioned is other parts of this document.

It should be noted that the USB stick 640 in FIG. 5C is merely one example of a computer-readable storage medium. Other examples may include compact discs, digital video discs, hard drives or other memory technologies commonly used.

The general functionality according to FIGS. 5A and 5B above will now be described in more detail in the following numbered subsections:

1. Identification of UE when accessing a new target network (Access B)
2. Finding the RAN context of the UE in a previous RAT (Access A)
3. Transferring of RAN related parameters and performing access network selection/service mapping decision based on those parameters The following additions will also be discussed:

4. Methods for conveying and/or executing access selection and service mapping decisions
5. Methods for using network assigned temporary identities in order to make it less complex to find the UE context in the previous RAT (Access A), as well as additional privacy or integrity functionality (avoiding the use of permanent identifiers).

1. Identification of the UE (FIG. 5B, Step 600)

Embodiments Based on IMSI

Figure 4:
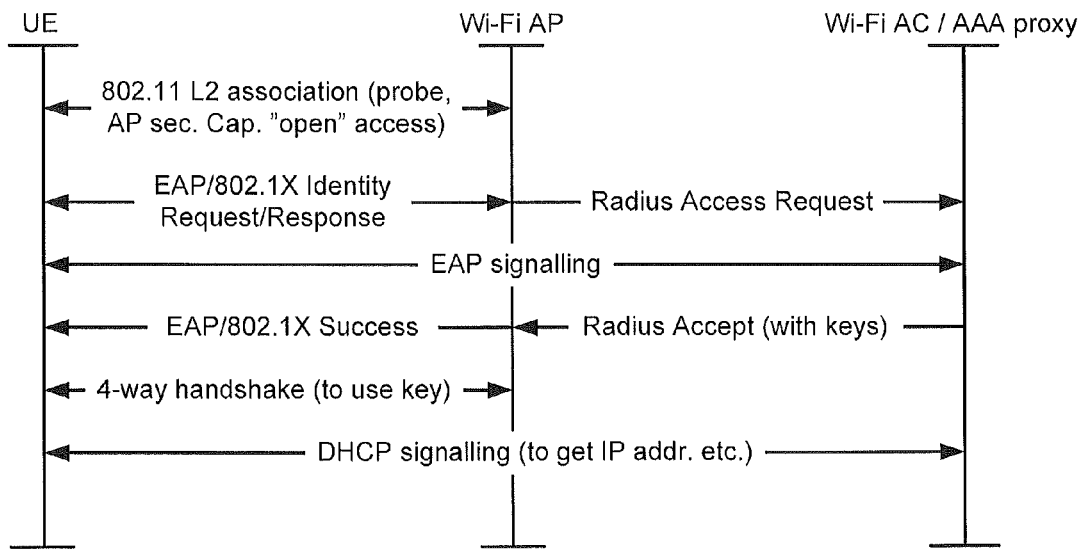
FIG. 4 shows an overview of an attach procedure used in for instance the Wi-Fi access network shown in FIG. 1.

If the UE supports EAP-SIM or EAP-AKA based authentication in Wi-Fi (i.e. Access B), it will (at least for initial attach) identify itself to the Wi-Fi network (internally the Wi-Fi Access Controller or some other node having the authenticator role), using the IMSI ((U)SIM-related identifier). For details about attach procedures used in Wi-Fi access networks, reference is made to the previous description with respect to FIG. 4 above.

Figure 3A:
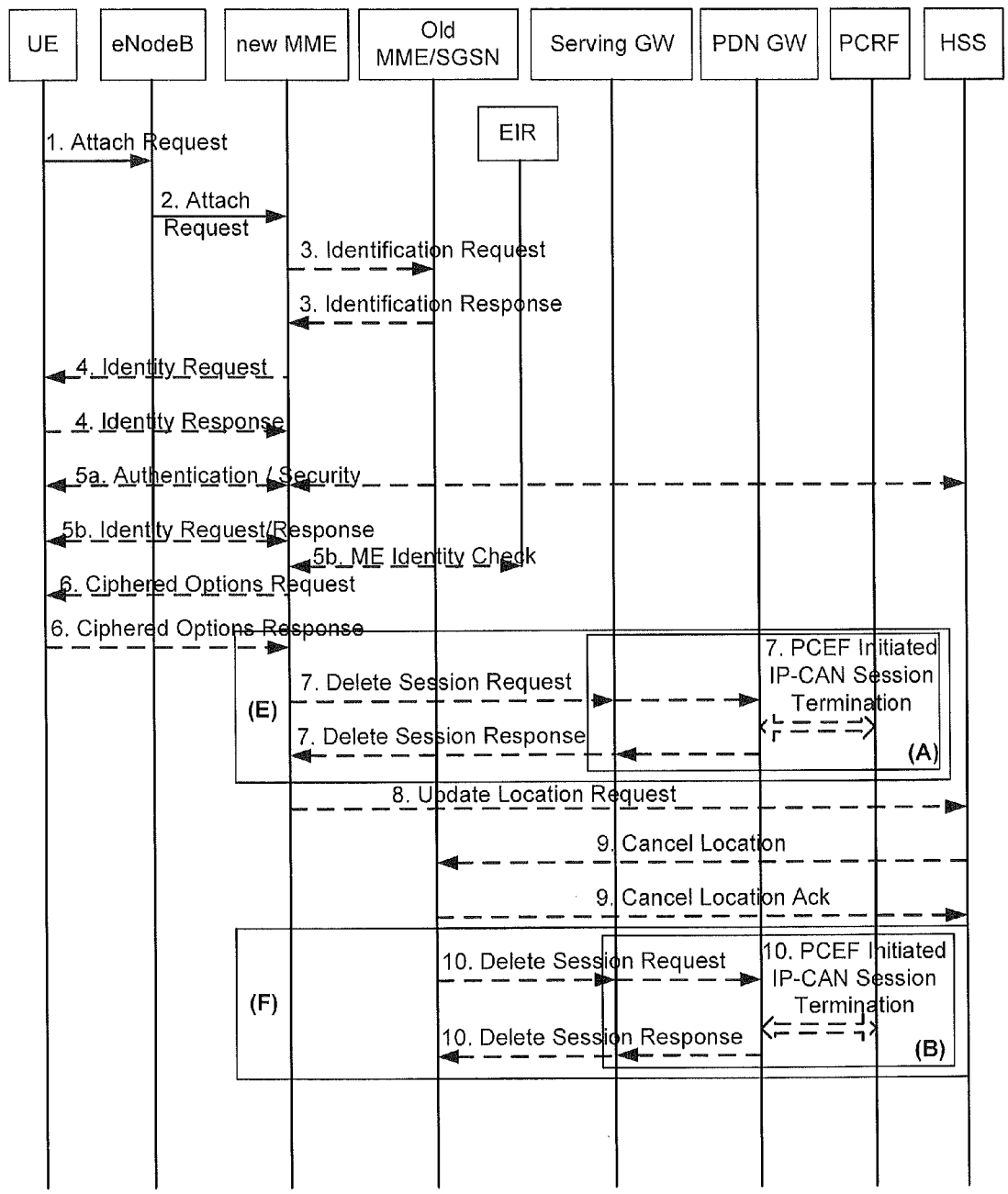
FIGS. 3A and 3B show an overview of an attach procedure used in for instance the radio access network of the mobile telecommunications system shown in FIG. 1.
Figure 3B:
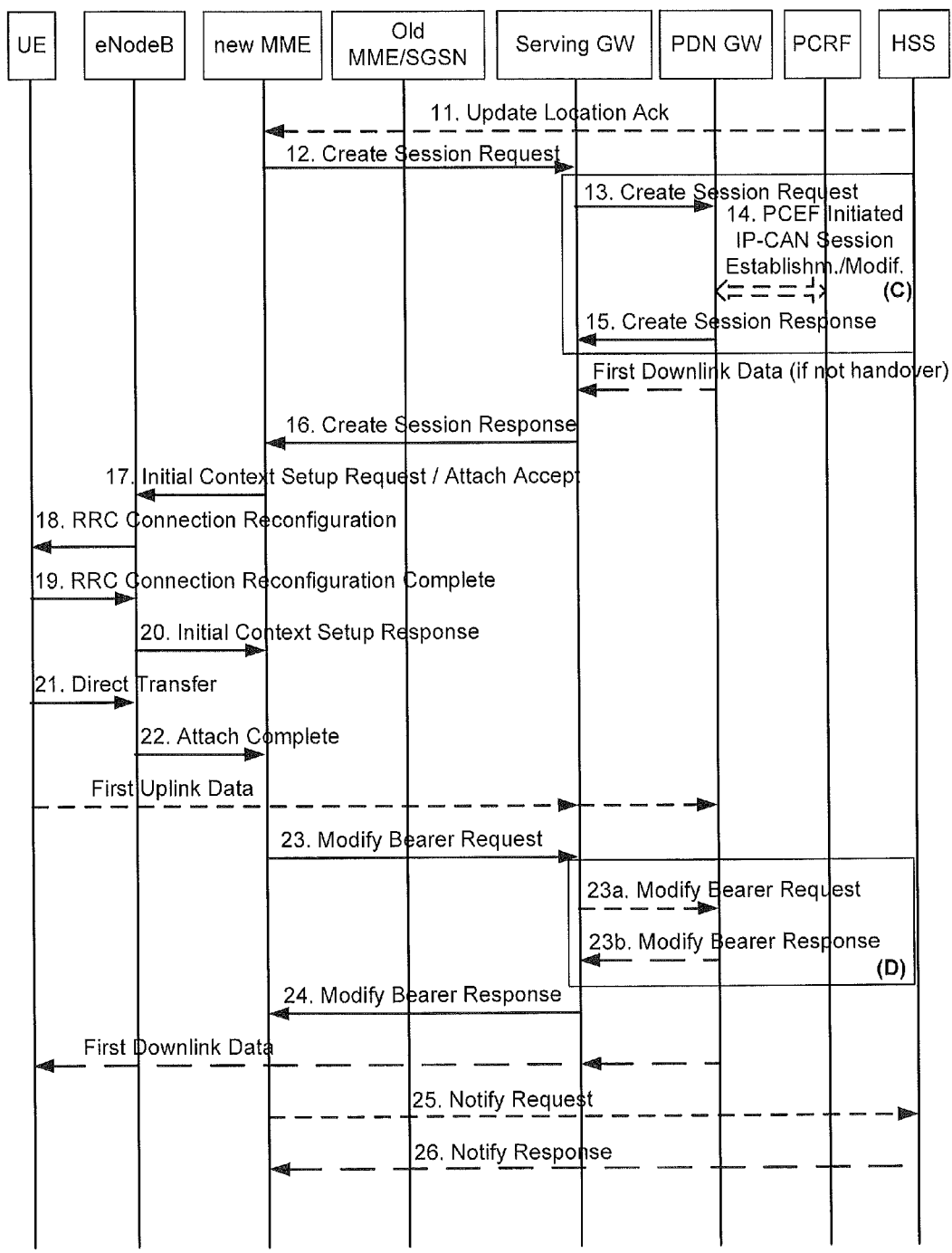

Similarly, when the UE performs access to 3GPP (i.e. Access A), it will (at least for initial attach) also use the IMSI as an identifier (towards the MME). For details about attach procedures used in 3GPP networks, reference is made to the previous description with respect to FIGS. 3A and 3B above.

This means that in a typical embodiment there will be a network node (or function) identifying that a particular UE (as given by the IMSI) is performing access to the target network (Access B). This node will then perform a procedure to try to locate the RAT context of the UE in the previous RAT (Access A).

Embodiments Based on Other Identifiers that can be Translated to IMSI by the Network (e.g. P-TMSI, S-TMSI, Temporary EAP Identifiers)

In case the UE has been previously connected to a particular access network, it might have been assigned an access-specific temporary identifier, such as 3GPP-defined S-TMSI or P-TMSI, EAP-SIM/AKA fast re-authentication NAI, etc. In this case, the network node responsible for the authentication needs to either have stored the permanent UE identity (e.g. IMSI received from the last time the UE was connected to the access network), or retrieve the permanent identity from another node or network resource, such as an AAA server or MME (FIG. 1) or Home Location Register (HLR). In the latter case, the temporary identifier is used to find the context in the other node.

In case the UE uses some non-(U)SIM-based mechanism to identify itself, such as EAP-TLS/TTLS based on a stored certificate in the UE, the network node responsible for the authentication in the access network needs to also retrieve the IMSI in conjunction with authentication procedure. The IMSI could in this case for instance be stored in an AAA-server or HLR, which also contains information about the certificate of the UE. During the authentication procedure the IMSI can be passed on to the node in the target access network responsible for the authentication of the UE.

Embodiments Based on Temporary Identifiers Assigned by Previous RAT (Access A)

Here, the source access network (Access A) will assign to the UE an UE identity while the UE is in Access A. This identity can be assigned using dedicated signaling, transferred in a secure manner over the radio interface of Access A. The actual identity could be made up of a random temporary identifier, such as 3GPP S-TMSI, P-TMSI, or it could be an IP address which the UE also uses for communication, or some specific bit-string. The identity can also, in combination with UE-specific identity, also contain information which is used for internal routing in the network (such as, for instance, identity information regarding the relevant MME, RNC, Wi-Fi AC, etc). Other possible combinations of identities are also possible.

When the UE later performs access to the target access network (Access B), it will transfer the assigned identity to the target access network (Access B), which then can be used by Access B to locate the UE context in the source access network (Access A).

2. Finding the RAN Context of the UE in a Previous RAT (FIG. 5B, Step 610)

Once the node responsible for authentication, i.e. the Authentication Node (AN) 530 of the UE in the target RAT (Access B) has determined the unique identifier (e.g. IMSI) of the UE seeking the access (as described in subsection 1 above), it will initiate procedure to locate the UE context in the previous RAT (Access A). This procedure is achieved by querying a node or function, namely the Query Node (QN) 540, which is aware of the UE location in the previous RAT. This Query Node is able to map the unique identifier to a UE RAN context located either in that node or in a separate node. In case the UE RAN context is located in a separate node (Previous RAT Node), the Query Node 540 will assist the communication between the separate node and the Authentication Node 530, either by providing addressing information of the Previous RAT Node to the Authentication Node 530, or by forwarding messages between the Previous RAT Node and Authentication Node 530.

The Authentication Node 530 can query multiple Query Nodes 540 for a given UE. In case a Query Node 540 is not aware of the location of the UE, it can either respond with a negative message to the Authentication Node 530, or it can in turn query another Query Node 540 which could know the location of the UE. In other words, the Query Nodes 540 can be cascaded. This procedure can be enhanced based on information in the Authentication Node 530 about the location (e.g. geo position) of the access nodes (e.g. 3GPP base stations, Wi-Fi APs) or UE, meaning that the Authentication Node 530 can focus on querying Query Nodes 540 which are associated with source RAT nodes which covers the same area as the target RAT nodes (e.g. the 3GPP cells which have partially overlapping coverage with the Wi-Fi cell that the UE is accessing).

The Query Node 540 can either be implemented together with RAT specific functions such as RNCs, Wi-Fi access controllers, MMEs, etc., or it can be a stand-alone node.

In the latter case it will receive signaling from the RAT specific nodes to update the Query Node 540 about the location of specific UEs. This signaling is described further below.

Figure 6:
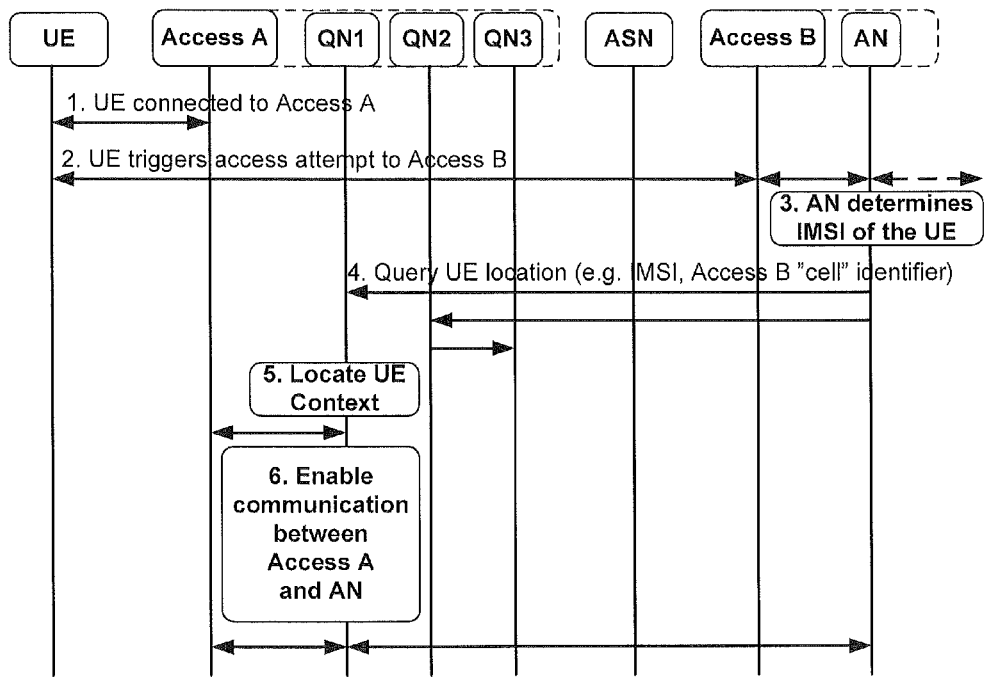
FIG. 6 is a schematic flowchart diagram of a procedure for finding context information about a user device in a first access network when seeking access to a second access network.

In the former case, i.e. when the Query Node 540 is implemented together with RAT specific functions, this signaling to update the location of specific UEs could be part of normal RAT specific mobility signaling (e.g. handovers, path switch, cell update). In addition, the Query Node 540 can also be implemented together with the Authentication Node 530. FIG. 6 shows an example of this case, where the RAN context of the UE is located in Access A (the source RAT) when the UE is attempting to access Access B (the target RAT).

Signalling Between RAT Specific Nodes and Query Nodes

In case the Query Nodes are implemented separately from the RAT specific nodes handling the UE RAN context (including mobility handling, etc.), the RAT specific node will perform signaling towards the Query Nodes when the UE register in the RAT the first time, and when the UE is moving in the RAT. In addition to this signalling, the RAT nodes can also inform the Query Node about UE specific information, such as UE capabilities, ongoing services, UE mobility states etc.

Figure 7:
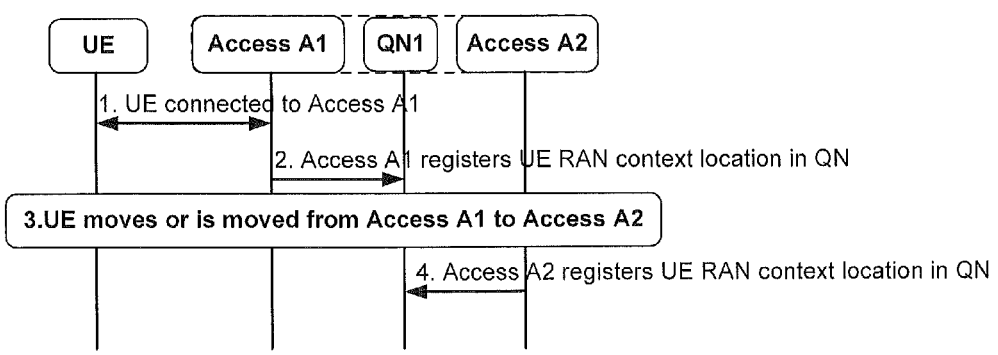
FIG. 7 is a schematic flowchart diagram of a procedure which can be used when maintaining the context information about the user device in the first access network.

The UE can be identified in this signaling by using a unique identifier (e.g. IMSI) or a temporary identifier assigned while the UE was in the source RAT (Access A). FIG. 7 shows an example of this case. The RAT specific nodes Access A1 and A2 can be for example RNCs, eNodeBs or MMEs, as described in other parts of this document.

3. Transferring of RAN Related Parameters and Performing Access Network Selection or Service Mapping Decision Based on Those Parameters (FIG. 5B, Steps 610 and 620)

In conjunction with the signaling to find the UE context in the source RAT (Access A) as described above and with reference to step 610 of FIG. 5B, it is possible to also transfer RAN related information from the source and target RATs (Access A and Access B) to the Access Selection Node, ASN, 550 responsible for performing access selection, and/or service mapping, decisions. This ASN node 550 is responsible for deciding if the UE should be accepted in the target access network (Access B) and/or if the UE should leave the source access network (Access A) or not. Furthermore, the ASN 550 node can decide if a specific service of the UE should be mapped on a specific access network among Access A or Access B.

The Access Selection Node 550 can base this decision upon RAN related parameters provided by the source and target RATs, as well as information provided from the UE. Possible parameters include (but are not limited to) information about:

UE mobility (e.g. UE speed)
Cell load in target or source cell
Transport network load
Radio link performance (e.g. Signal to Noise ratio, coding or modulation scheme used)
RAT-specific limitations (e.g. maximum bit rates, service limitations)
Ongoing UE services
UE device capabilities for the different RATs
Subscription profile of the end-user (e.g. different subscription classes (gold/silver/bronze), pre-paid/post-paid, etc.

These parameters can be sent to the ASN 550 both from Access A (source RAT) and from Access B (target RAT) in order to facilitate access selection and/or service mapping decision by the ASN 550 based on those parameters. The parameters can also be sent from a node outside of the source and target RATs, such as for instance by a node in a core network coupled to any of the RATs. For instance, the relevant information for the parameters may be held by an MME in the core network 114 coupled to the RAT 112 as seen in FIG. 1.

The signaling to transfer these parameters to the ASN 550 can be performed as separate signaling or piggybacked on the messages used to locate the RAN context.

The Access Selection Node 550 can be implemented together with the Authentication Node 530 and/or Query Node(s) 540, or as a stand-alone entity. The Access Selection Node 550 can even be implemented in the UE based on information provided by the network (e.g. from source/target RAT). In case the Access Selection Node 550 is implemented in the network, it can be implemented together with existing nodes e.g. MMEs, RNCs, Wi-Fi AP, Wi-Fi AC, eNodeB, etc.

Figure 8:
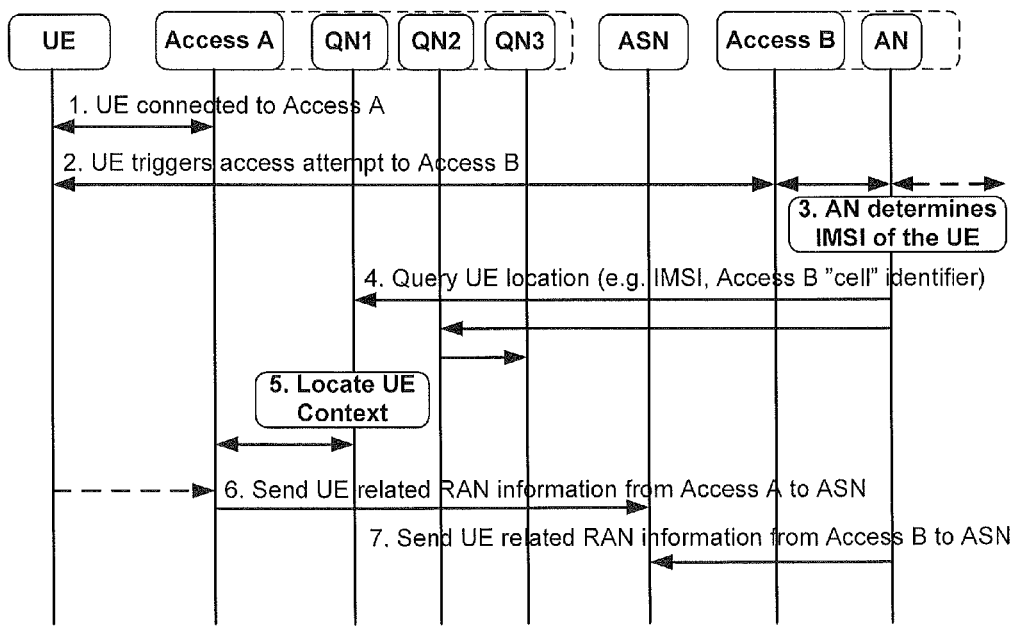
FIG. 8 is a schematic flowchart diagram of a procedure for transferring of parameters related to the first and second access networks, for use when performing an access network selection and/or service mapping decision for the user device seeking access to the second access network.

FIG. 8 shows an example of this case. This example is based on that the signalling from the AN 530 towards the QN(s) 540 is separate from the signalling towards the ASN 550. Steps 1 to 5 are the same as in FIG. 6, and the new parts are shown as steps 6 and 7.

4. Methods for Conveying and/or Executing Access Selection and/or Service Mapping Decisions (FIG. 5B, step 630)

Based on the information made available according to the preceding subsections as described above, the ASN 550 takes an access selection and/or service mapping decision for the access sought by the UE to the second access network (Access B, target RAT). The decision taken needs to be conveyed to different parts of the network depending on the decision taken, in accordance with the following:

If the decision taken is to reject the UE's access attempt to Access B, then the ASN 550 informs the AN 530 in Access B about the decision. Thus, the AN 530 performs the needed signalling towards the UE to indicate the rejected access attempt.

If the decision taken is to accept the UE's access attempt to Access B, then the ASN 550 informs the AN 530 in Access B about the decision. Thus, the AN 530 performs the needed signalling towards the UE to indicate the accepted access attempt.

If the decision taken is a service mapping decision (i.e. the UE is allowed to access both Access A and Access B simultaneously), the ASN 550 needs to inform both the network side and the UE about the decision. The UE needs this information to be able to perform the decided service mapping in the uplink direction. At the network side, there needs to exist a common point in the network that performs the service mapping in the downlink direction towards Accesses A and B.

If the functionality of the ASN 550 is implemented in the UE and the decision is to not continue with the access attempt to Acccess B, the UE will stop performing access to Access B. This could include sending some signaling messages to Access B or A.

Figure 9:
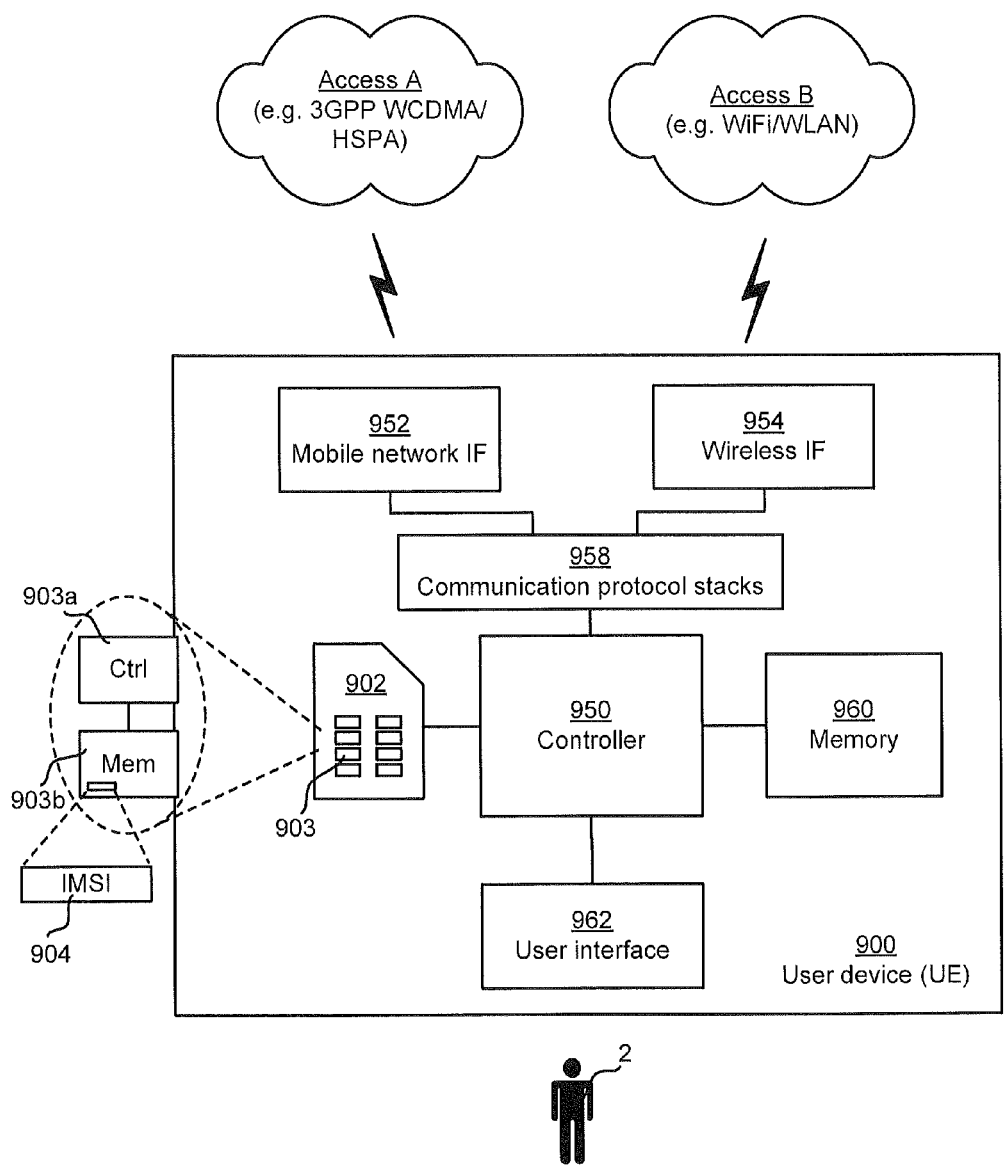
FIG. 9 is a schematic block diagram of a user device which is connectable to first and second access networks.

FIG. 9 illustrates a user device 900 which is connectable to first and second access networks, Access A and Access B. The user device 900 may implement the UE 500 according to the preceding drawings and descriptions.

The user device 900 has a controller 950 which has the overall responsibility for controlling the operation of the user device 900. In the disclosed embodiment, the controller 950 is a central processing unit (CPU), but it can alternatively be a digital signal processor (DSP), or other programmable electronic logic device such as an application-specific integrated circuit (ASIC) or field-programmable gate array (FPGA). The controller 950 is coupled to a memory 960 which comprises a work memory and a storage memory. The memory 960 may for instance be implemented in the form of RAM, EEPROM, flash memory (e.g. memory card), magnetic hard disk, or any combination thereof. The memory 960 is capable of storing program code which is executable by the controller 950 so as to cause performing of the terminal-side part of the functionalities as described in various parts of this document. In alternative embodiments, some or all of the terminal-side functionality may instead be performed by dedicated hardware.

The user device 900 has a mobile network interface 952 which allows the user device 900 to communicate with the first access network, Access A. The mobile network interface 952 comprises an internal or external antenna as well as appropriate radio circuitry for establishing and maintaining a wireless link to a nearby base station in the first access network, Access A. The radio circuitry comprises a radio receiver and transmitter formed for instance by band pass filters, amplifiers, mixers, local oscillators, low pass filters, AD/DA converters, etc.

In addition, the disclosed embodiment of the user device 900 has a wireless interface 954 which may be adapted for communication in accordance with one or more short-range wireless communication standards such as WiFi (e.g. IEEE 802.11, WLAN), Bluetooth, Near Field Communication (NFC), or Infrared Data Association (IrDA). In addition, but not shown in FIG. 9, a serial interface such as USB may allow the user device 900 to communicate over a serial cable with for instance a personal computer. Such interfaces may be absent in other embodiments.

Communication protocol stacks 958 are provided to allow communication via any of the interfaces 952 and 954.

A user interface 962 allows a user 2 to interact with the user device 900. The user interface 962 includes display means, such as at least one LCD display, as well as input means for the user. The input means may e.g. include a keypad with alpha-numeric keys and/or other keys such as arrow keys (navigation keys) and functional keys (soft keys), and/or a joystick, touch pad, rotator, jog dial, etc. The display means and input means may be jointly realized by a touch-sensitive display in some embodiments. The user interface 962 typically also involves a loudspeaker and a microphone.

The user device 900 may also be provided with other well-known components, such as power switch, battery, charger interface, accessory interface, and volume controls; such elements are however not indicated in FIG. 9 for the sake of brevity.

To be able to act as a mobile terminal at least with respect to the first access network, Access A, the user device 900 has a (U)SIM reader capable of accessing a (U)SIM card 902. The (U)SIM card 902 comprises electronic circuitry 903 which constitutes a local (U)SIM controller 903a and a memory 903b. The memory 903b has a memory area 904 for storing the subscriber identity in the form of an IMSI number.

Hence, whenever a permanent IMSI number has been referred to in the previous drawings and associated description, it is to be understood that such a permanent IMSI number can be read from the (U)SIM memory 903b and be presented by the user device 900 to the access network (Access B or Access A) which it is presently seeking access to.

Moreover, whenever a temporary UE identity (such as P-TMSI or S-TMSI) or a non-IMSI UE identifier has been referred to in the previous drawings and associated description, it is to be understood that such a temporary UE identity or non-IMSI UE identifier can be read from the (U)SIM memory 903b or from the memory 960 and be presented by the user device 900 to the access network (Access B or Access A) which it is presently seeking access to.

Figure 10:
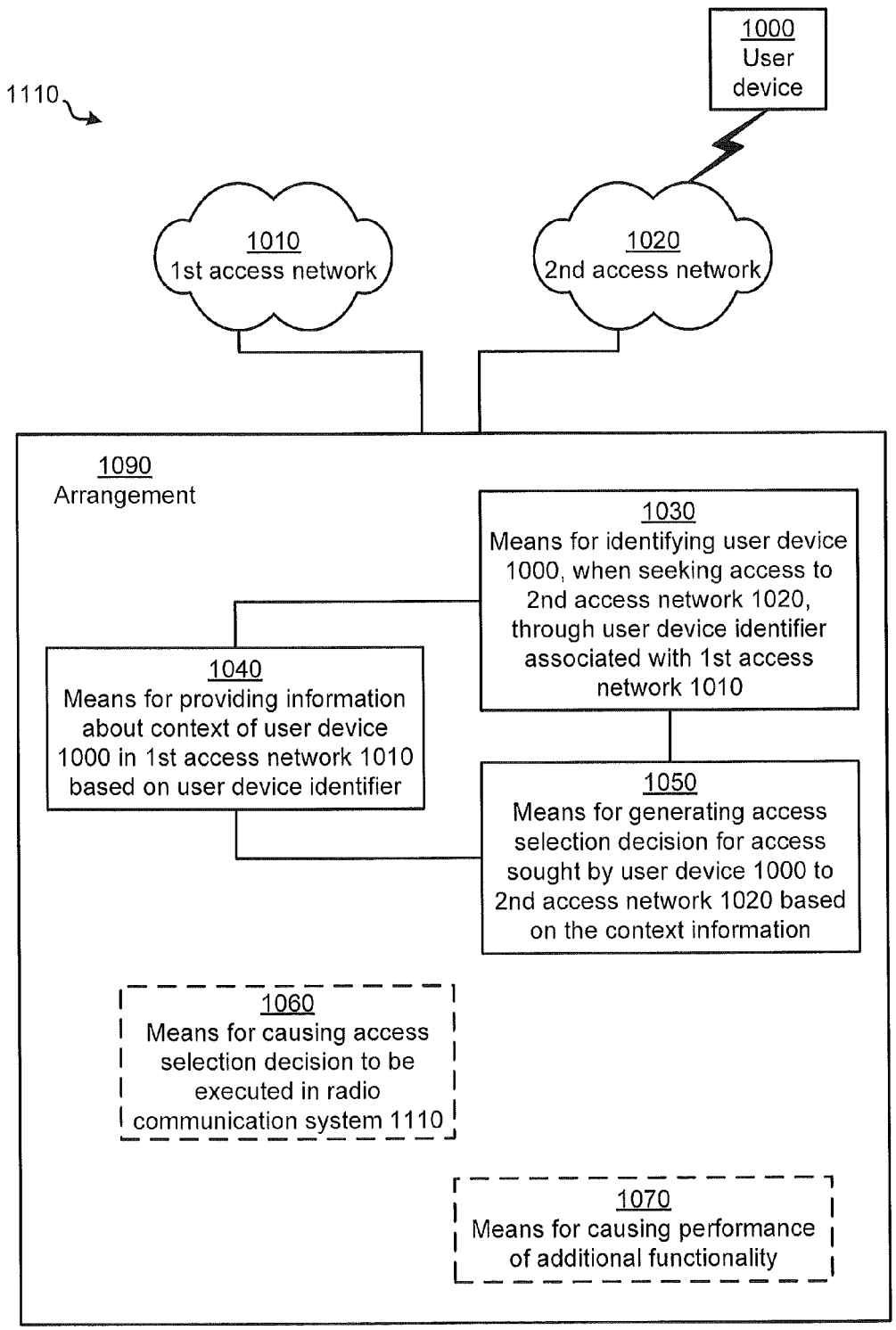
FIG. 10 is a schematic block diagram illustrating an arrangement according to one aspect of the invention.

FIG. 10 is a schematic block diagram illustrating an arrangement 1090 for use in a radio communication system 1110, wherein the radio communication system 1110 comprises a first access network 1010 arranged to operate according to a first Radio Access Technology, and a second access network 1020 arranged to operate according to a second Radio Access Technology. The first access network 1010 may, for instance, be the access network referred to as Access A and/or 510 in the embodiments described above. The second access network 1020 may, for instance, be the access network referred to as Access B or 520 in the embodiments described above.

As seen in FIG. 10, the arrangement 1090 comprises means 1030 for identifying a user device 1000, when seeking access to the second access network 1020, through a user device identifier for the user device, the user device identifier being associated with the first access network 1010. The user device 1000 may, for instance, be the device referred to as UE, 500 or 900 in the embodiments described above. The means 1030 may, for instance, be the authentication node referred to as AN or 530 in the embodiments described above, and the means 1030 may, for instance, be adapted to perform the step 600 in FIG. 5B.

The arrangement 1090 further comprises means 1040 for providing information about a context of the user device 1000 in the first access network 1010 based on the user device identifier. The means 1040 may, for instance, be the query node referred to as QN or 540 in the embodiments described above, and the means 1040 may, for instance, be adapted to perform the step 610 in FIG. 5B.

The arrangement 1090 also comprises means 1050 for generating an access selection decision for the access sought by the user device 1000 to the second access network 1020 based on the provided context information. The means 1050 may, for instance, be the access selection node referred to as ASN or 550 in the embodiments described above, and the means 1050 may, for instance, be adapted to perform the step 620 in FIG. 5B.

The arrangement 1090 may also comprise means 1060 for causing the access selection decision to be executed in the radio communication system 1110. The means 1060 may, for instance, be adapted to perform the step 630 in FIG. 5B, and it may, for instance, be adapted to cause the access selection decision to be executed by appropriately informing the relevant element(s) in the radio communication system 1110 about the access selection decision taken, as has been described above under subsection 4 in this detailed description section.

The arrangement 1090 may further comprise means (collectively referred to as 1070 in FIG. 10), for performing any or all of the additional functionality described for the embodiments above and, particularly, any steps of the method referred to in the summary section of this document.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A radio communication system configured to provide communication with a user device, the radio communication system comprising:

a first access network arranged to operate according to a first Radio Access Technology capable of providing a communication service over a first communication path to a user device through the first access network;

a second access network arranged to operate according to a second Radio Access Technology capable of providing the communication service over a second communication path to the user device through the second access network, wherein the user device is connectable to said first access network and to said second access network and wherein the first and second Radio Access Technologies are different;

an authentication node arranged to identify said user device, when seeking access to said second access network, through a user device identifier for said user device, wherein said user device identifier is associated with said first access network, and wherein said authentication node is arranged to identify said user device based on the user device identifier provided by the user device;

a query node arranged to provide information about a context of said user device in said first access network based on said user device identifier; and an access selection node arranged to generate an access selection decision for the access sought by the user device to the second access network based on the provided context information, wherein said system is arranged to cause said access selection decision to be executed.

2. The system according to claim 1, wherein said identifier comprises an International Mobile Subscriber Identity (IMSI).

3. The system according to claim 1, wherein said identifier comprises a temporary identifier assigned to said user device in said first access network, and wherein said authentication node is arranged to use the temporary identifier to retrieve a permanent identifier of said user device from a network resource in or via said first access network.

4. The system according to claim 1, wherein the context information provided by said query node about said user device includes a current location of said user device in said first access network.

5. The system according to claim 1, wherein said query node is further configured to signal with said first access network and/or said second access network to provide parameters to said access selection node, wherein said access selection node is configured to generate said access selection decision based on said parameters.

6. The system according to claim 5, wherein said parameters relate to one or more of the following:
   mobility data about said user device,
   work load for a current access point of said user device in said first access network,
   work load for an access point in said second access network to which said user device seeks access,
   transport network load in either of said first or second access networks,
   radio link performance for said user equipment in said first access network,
   Radio Access Technology-specific limitations in either of said first or second access networks,
   ongoing services used by said user device,
   capabilities of said user device for said first or second Radio Access Technologies, and
   a subscription profile of an end-user associated with said user device.

7. The system according to claim 1, wherein said access selection decision involves at least one of the following:
   connecting said user device to said second access network,
   disconnecting said user device from said first access network,
   mapping a first communication service of said user device to said first access network and a second communication service of said user device to said second access network, and
   maintaining connection for said user device with said first access network.

8. The system according to claim 1, wherein said access selection node is further configured to cause transmission of said access selection decision to said user device for execution of said access selection decision.

9. The system according to claim 1, wherein said access selection node is further configured to cause transmission of said access selection decision to said first access network and/or to said second access network for execution of said access selection decision.

10. The system according to claim 1, wherein said first access network is part of a mobile telecommunication system compliant with GSM, UMTS, FOMA, LTE, D-AMPS or CDMA2000.

11. The system according to claim 1, wherein said second access network is a short-range wireless communication network compliant with IEEE 802.11.

12. The system according to claim 1, wherein the access selection decision involves connecting the user device to the second access network including,
   identifying the communication service provided initially to the user device through the first access network,
   analyzing the provided context information of the user device, and
   selecting the second access network to provide the communication service to the user device based on the provided context information of the user device,
   wherein causing the access selection decision to be executed comprises providing the communication service through the second access network.

13. The system according to claim 1, wherein the access selection decision involves maintaining connection for the user device with the first access network including,
   identifying the communication service provided initially to the user device through the first access network,
   analyzing the provided context information of the user device, and
   selecting the first access network to provide the communication service to the user device based on the provided context information of the user device,
   wherein the execution of the access selection decision comprises continuing to provide the communication service through the first access network.

14. The system according to claim 1, wherein the access selection decision involves mapping a first communication service of said user device to said first access network and a second communication service of said user device to said second access network including,
   identifying the first communication service and the second communication service provided initially to the user device through the first access network,
   analyzing the provided context information of the user device,
   selecting the first access network to provide the first communication service to the user device based on the provided context information of the user device, and selecting the second access network to provide the second communication service to the user device based on the provided context information of the user device, wherein the execution of the access selection decision comprises providing the first communication service through the first access network and providing the second communication service through the second access network.

15. A method for use in a radio communication system of the type which comprises a first access network arranged to operate according to a first Radio Access Technology capable of providing a communication service over a first communication path through the first access network, a second access network arranged to operate according to a second Radio Access Technology capable of providing the communication service over a second communication path through the second access network and wherein the first and second Radio Access Technologies are different, and a user device which is connectable to said first access network over the first communication path and to said second access network over the second communication path, wherein said method comprises:

identifying said user device, when seeking access to said second access network, through a user device identifier for said user device,
wherein said user device is identified based on a user device identifier provided by the user device, and
wherein said user device identifier is associated with said first access network;
providing information about a context of said user device in said first access network based on said user device identifier;
generating an access selection decision for the access sought by the user device to the second access network based on the provided context information; and
causing execution of said access selection decision.

16. The method according to claim 15, wherein said identifier is an International Mobile Subscriber Identity (IMSI).

17. The method according to claim 15, wherein said identifier is a temporary identifier assigned to said user device in said first access network, and wherein the identifying of said user device further comprises using the temporary identifier to retrieve a permanent, identifier of said user device from a network resource in or via said first access network.

18. The method according to claim 15, wherein the context information provided by said query node about said user device includes a current location of said user device in said first access network.

19. The method according to claim 15, further comprising:
signaling with said first access network and/or said second access network to provide parameters; and
generating said access selection decision based on the provided parameters.

20. The method according to claim 19, wherein said parameters relate to one or more of the following:
mobility data about said user device,
work load for a current access point of said user device in said first access network,
work load for an access point in said second access network to which said user device seeks access,
transport network load in either of said first or second access networks,
radio link performance for said user equipment in said first access network,
Radio Access Technology-specific limitations in either of said first or second access networks,
ongoing services used by said user device,
capabilities of said user device for said first or second Radio Access Technologies, and
a subscription profile of an end-user associated with said user device.

21. The method according to claim 15, wherein said access selection decision involves at least one of the following:
connecting said user device to said second access network,
disconnecting said user device from said first access network,
mapping a first communication service of said user device to said first access network and a second communication service of said user device to said second access network, and
maintaining connection for said user device with said first access network.

22. The method according to claim 15, wherein the generated access selection decision is transmitted to said user device for execution of the access selection decision.

23. The method according to claim 15, wherein the generated access selection decision is transmitted to said first access network and/or to said second access network for execution of the access selection decision.

24. A computer readable storage medium encoded with instructions that, when loaded and executed by a processor, cause performance of the method according to claim 15.

25. The method according to claim 15, wherein generating the access selection decision comprises connecting the user device to the second access network including,
identifying the communication service provided initially to the user device through the first access network,
analyzing the provided context information of the user device, and
selecting the second access network to provide the communication service to the user device based on the provided context information of the user device,
wherein causing execution of the access selection decision comprises providing the communication service through the second access network.

26. The method according to claim 15, wherein generating the access selection decision comprises maintaining connection for the user device with the first access network including,
identifying the communication service provided initially to the user device through the first access network,
analyzing the provided context information of the user device, and
selecting the first access network to provide the communication service to the user device based on the provided context information of the user device,
wherein causing execution of the access selection decision comprises continuing to provide the communication service through the first access network.

27. The method according to claim 15, wherein generating the access selection decision comprises mapping a first communication service of the user device to the first access network and a second communication service of the user device to the second access network including,
identifying the first communication service and the second communication service provided initially to the user device through the first access network,
analyzing the provided context information of the user device,
selecting the first access network to provide the first communication service to the user device based on the provided context information of the user device; and selecting the second access network to provide the second communication service to the user device based on the provided context information of the user device, wherein causing execution of the access selection decision comprises providing the first communication service through the first access network and providing the second communication service through the second access network.

28. A node for use with a first access network arranged to operate according to a first Radio Access Technology capable of providing a communication service over a first communication path to a user device through the first access network and a second access network arranged to operate according to a second Radio Access Technology capable of providing the communication service over a second communication path to the user device through the second access network, wherein the user device is connectable to said first access network and to said second access network and wherein the first and second Radio Access Technologies are different, wherein said node comprises:

means for obtaining a user device identifier identifying the user device, when seeking access to said second access network, wherein said user device identifier is associated with said first access network, wherein the user device identifier is provided by the user device;

means for obtaining information about a context of said user device in said first access network based on said user device identifier;

means for generating an access selection decision for the access sought by the user device to the second access network based on the provided context information; and means for causing said access selection decision to be executed.

29. The node according to claim 28, wherein the means for generating the access selection decision comprises means for connecting the user device to the second access network including, means for identifying the communication service provided initially to the user device through the first access network, means for analyzing the provided context information of the user device, and means for selecting the second access network to provide the communication service to the user device based on the provided context information of the user device, wherein the means for causing the access selection decision to be executed comprises means for providing the communication service through the second access network.

30. The node according to claim, 28, wherein the means for generating the access selection decision comprises means for maintaining connection for the user device with the first access network including, means for identifying the communication service provided initially to the user device through the first access network, means for analyzing the provided context information of the user device, and means for selecting the first access network to provide the communication service to the user device based on the provided context information of the user device, wherein the means for causing the access selection decision to be executed comprises means for continuing to provide the communication service through the first access network.

31. The node according to claim 28, wherein the means for generating the access selection decision comprises means for mapping a first communication service of said user device to said first access network and a second communication service of said user device to said second access network including, means for identifying the first communication service and the second communication service provided initially to the user device through the first access network, means for analyzing the provided context information of the user device, means for selecting the first access network to provide the first communication service to the user device based on the provided context information of the user device, and means for selecting the second access network to provide the second communication service to the user device based on the provided context information of the user device, wherein the means for executing the access selection decision comprises means for providing the first communication service through the first access network and providing the second communication service through the second access network.

* * * * *

UNITED STATES PATENT AND TRADEMARK OFFICE
CERTIFICATE OF CORRECTION

| | |
|---|---|
| PATENT NO. | : 8,942,763 B2 |
| APPLICATION NO. | : 13/697767 |
| DATED | : January 27, 2015 |
| INVENTOR(S) | : Mildh et al. |

It is certified that error appears in the above-identified patent and that said Letters Patent is hereby corrected as shown below:

In the Claims

In Column 21, Line 43, in Claim 17, delete "permanent, identifier" and insert -- permanent identifier --, therefor.

Signed and Sealed this
Fourth Day of August, 2015

Michelle K. Lee
*Director of the United States Patent and Trademark Office*